US012011402B2

(12) United States Patent
Anderson et al.

(10) Patent No.: US 12,011,402 B2
(45) Date of Patent: Jun. 18, 2024

(54) FEMALE URINATION ASSISTANCE APPARATUS

(71) Applicant: Wesley Daniel Anderson, Valdosta, GA (US)

(72) Inventors: Wesley Daniel Anderson, Valdosta, GA (US); Thomas Cartwright, Stuart, FL (US); Maureen Lincoln, Bronx, NY (US)

(73) Assignee: Wesley Anderson, Valdosta, GA (US)

( * ) Notice: Subject to any disclaimer, the term of this patent is extended or adjusted under 35 U.S.C. 154(b) by 0 days.

(21) Appl. No.: 17/577,057

(22) Filed: Jan. 17, 2022

(65) Prior Publication Data

US 2022/0226172 A1 Jul. 21, 2022

Related U.S. Application Data

(60) Provisional application No. 63/138,415, filed on Jan. 16, 2021.

(51) Int. Cl.
*A61G 5/10* (2006.01)
*A61G 5/14* (2006.01)

(52) U.S. Cl.
CPC ............. *A61G 5/1002* (2013.01); *A61G 5/14* (2013.01)

(58) Field of Classification Search
CPC ................................ A61G 5/1002; A61G 5/14
See application file for complete search history.

(56) References Cited

U.S. PATENT DOCUMENTS

| | | | |
|---|---|---|---|
| 5,255,934 | A | 10/1993 | Wilson |
| 5,564,136 | A | 10/1996 | Cox |
| 5,956,782 | A | 9/1999 | Olguin |
| 7,836,525 | B2 | 11/2010 | Castillo et al. |
| 2015/0272796 | A1 | 10/2015 | Kicos |

*Primary Examiner* — Philip F Gabler

(57) ABSTRACT

A female urination assistance apparatus for use by any women that can be easily fixed on a chair is disclosed. The apparatus may comprise a base layer for placing on the top of the chair. A lower foam assembly fixed on top of the base layer contains plurality of channels for positioning of collection tube for transferring the urine. The collection fittings comprising of an inlet portion, an outlet portion and the collection tube are disposed of in the lower foam assembly. Further, a silicon support is present to secure the inlet portion of the collection fittings. Furthermore, a collection funnel retained in the silicon support is also provided which has an opening for the outflow of urine. The entire structure is covered by a flap closure cover with gel insert. The gel insert provides the interface between the user and the apparatus.

7 Claims, 22 Drawing Sheets

FEMALE URINATION ASSISTANCE APPARATUS

CROSS-REFERENCE TO RELATED APPLICATIONS

This application claims benefit of U.S. Provisional Application Ser. No. 63/138,415 entitled "Urination assistance apparatus for physically disabled women", filed Jan. 16, 2021, which is incorporated herein in its entirety.

TECHNICAL FIELD

The present invention relates to the field of waste disposal apparatus for aiding disabled women and more particularly relates to a urination assistance apparatus and assembly which can be easily mounted on a chair for physically disabled women.

BACKGROUND

Due to various ailments and illness, many people face difficulty in performing routine bodily functions, especially discharging waste from the body. Individuals face extreme difficulties in performing activities mundane yet unavoidable activities such as bathing and using toilets due to loss of ability to move. These also lead to a feeling of humiliation and low self-esteem in the individual. Offering safe and effective solutions to allow such individuals perform activities such as urination would help them become independent to an extent and protect their dignity.

When it comes to urination for immobile individuals, the problem becomes more complicated for women. The anatomical attributes of women make it comparatively more complex and tricky for designers to create urinals that support their requirements. Inventors across the world have devised various solutions to allow waste disposal for disabled individuals over the years.

U.S. Pat. No. 5,564,136A discloses an incontinence seat for a wheelchair that includes a seat insert attached to a wheelchair frame, the seat insert has a hole in the center. A cushion is attached to the seat insert; the cushion has a hole in the center aligned with the seat insert hole. A support bag is attached to the wheelchair frame below the seat insert. A collection bag, configured to fit through the seat insert hole and cushion hole, has a drawstring provided at a mouth of the collection bag, the bottom of the collection bag is nested inside the support bag, the inner surface of the mouth is inverted and wrapped around and under the cushion. A seat cover is affixed to the inner surface of the mouth of the collection bag, the seat cover includes a gutter flap and a seat cover hole aligned with the cushion and seat insert holes, the gutter flap is hinged to the seat cover, a deodorant pack may be affixed to the gutter flap.

U.S. Pat. No. 5,255,934A discloses a wheelchair including a wheeled base assembly provided with an upright assembly thereon, the latter including a pair of vertical post arrangements which are provided adjacent front corners of the wheelchair and are vertically extendible and retractable. The upright assembly includes a pair of generally parallel and approximately horizontal arms which are mounted adjacent upper ends of the upright post arrangements. A seat assembly is removably attached to and positioned between the arms. The seat assembly includes a seat portion defined by normally vertically superimposed upper and lower seat subassemblies. The upper subassembly has an enlarged opening formed centrally there through. The lower subassembly can be detached and moved from beneath the upper subassembly to permit the seat portion of the wheelchair to be positioned directly over and utilized in conjunction with a conventional toilet so as to not require removal of the occupant from the seat assembly.

U.S. Pat. No. 5,956,782A discloses a urinal device for use by female persons not having the use of their legs while seated in a chair or wheelchair. The urinal device has a pie-slice shaped shallow pan with a swollen, bulbous cross-section lip completely around the periphery thereof and a perforated splash plate. A handle is affixed to the pan opposite the narrow end of the pan so that the impaired person may insert the pan beneath her body without lifting her body or legs from the chair seat. The pan is continuously drained during use by means of a drainage hose connected to a urine receiving container.

U.S. Pat. No. 7,836,525B2 discloses a Comfort Seat and Commode Device that is adaptable for incorporation into a wheel chair, an ordinary arm chair or couch or bed, a hospital bed, or any other means of convalescence or permanent occupation by the disabled, is herein disclosed. The device's framework supports a seat portion that is capable of rotating to provide an opening through which a patient or disabled person may eliminate waste. The rotatable seat is located in-line vertically with a waste bin and cover that comprise the commode. An actuation means is provided, which, in response to a command by the user, simultaneously opens the waste bin cover, rotates the seat, and elevates the waste bin to permit use of the device. A means of providing squirting action of a cleaning solution to cleanse the user after elimination, as well as a drying system, may also be incorporated into the device.

US20150272796A1 discloses a wheelchair with a waste disposal system. The wheelchair includes a frame and a seat including a first cushion including an inner surface defining a first aperture. A second cushion includes an inner surface defining a second aperture. A receiving member is positioned between the cushions and includes an inner surface defining a channel having a first opening at a first end of the receiving member and a second opening at a second end of the receiving member. A drainage member is coupled to the second end of the receiving member and includes an inner surface defining a passageway that is in communication with each of the apertures and the channel. The passageway includes a third opening at a first end of the drainage member and a fourth opening at a second end of the drainage member. A collection container is positioned adjacent the second end of the drainage member.

While the prior arts disclose various apparatuses and techniques for waste disposal and collection, they are not specific to female users and do not address all their needs. Also, the mechanical and technical solution offered by the prior-arts may not allow independent usage of the apparatus by a disabled individual. Moreover, the apparatuses described by the prior arts are not portable and cannot be fixed readily onto any chair, especially generic wheelchairs available in the market. Therefore, there exists a need for a comprehensive solution that overcomes the disadvantages of the prior arts. The present disclosure proposes a novel apparatus that addresses the abovementioned problems.

SUMMARY

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

Embodiments described herein discloses a female urination assistance device apparatus for physically disabled women which can be easily mounted in a chair or a wheelchair. The apparatus primarily comprises of a base layer, a lower foam assembly, collection fittings, a silicon support, a collection funnel, an upper foam assembly, a flap closure cover with gel insert, a urine collection bag, and a tote bag. The base layer is placed on top of any chair's seat and on top of which the lower foam assembly is disposed of. This lower foam assembly includes plurality of channels for positioning of collection tube whereby the user selects one of the plurality of channels. The collection fitting disposed on in the lower foam assembly comprises of the inlet portion for collection of urine, the collection tube for transfer of the same to the outlet portion. The silicon support is securely encloses the inlet portion and in the same collection funnel is fitted which has an opening for the outflow of urine to the inlet portion of collection fittings. The upper foam assembly which is a set of cut foam components that fixes the positioning of the silicon support and the collection funnel. The entire apparatus is enclosed by a flap closure cover with gel insert that provides an interface between the user and the apparatus. The urine collection bag may be placed inside a tote bag that acts as a disguise to the collection bag and has a push valve that aids in collection of the urine from the collection tube. The tote bag may be hung onto the wheelchair like any normal bag.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

Figure 1:
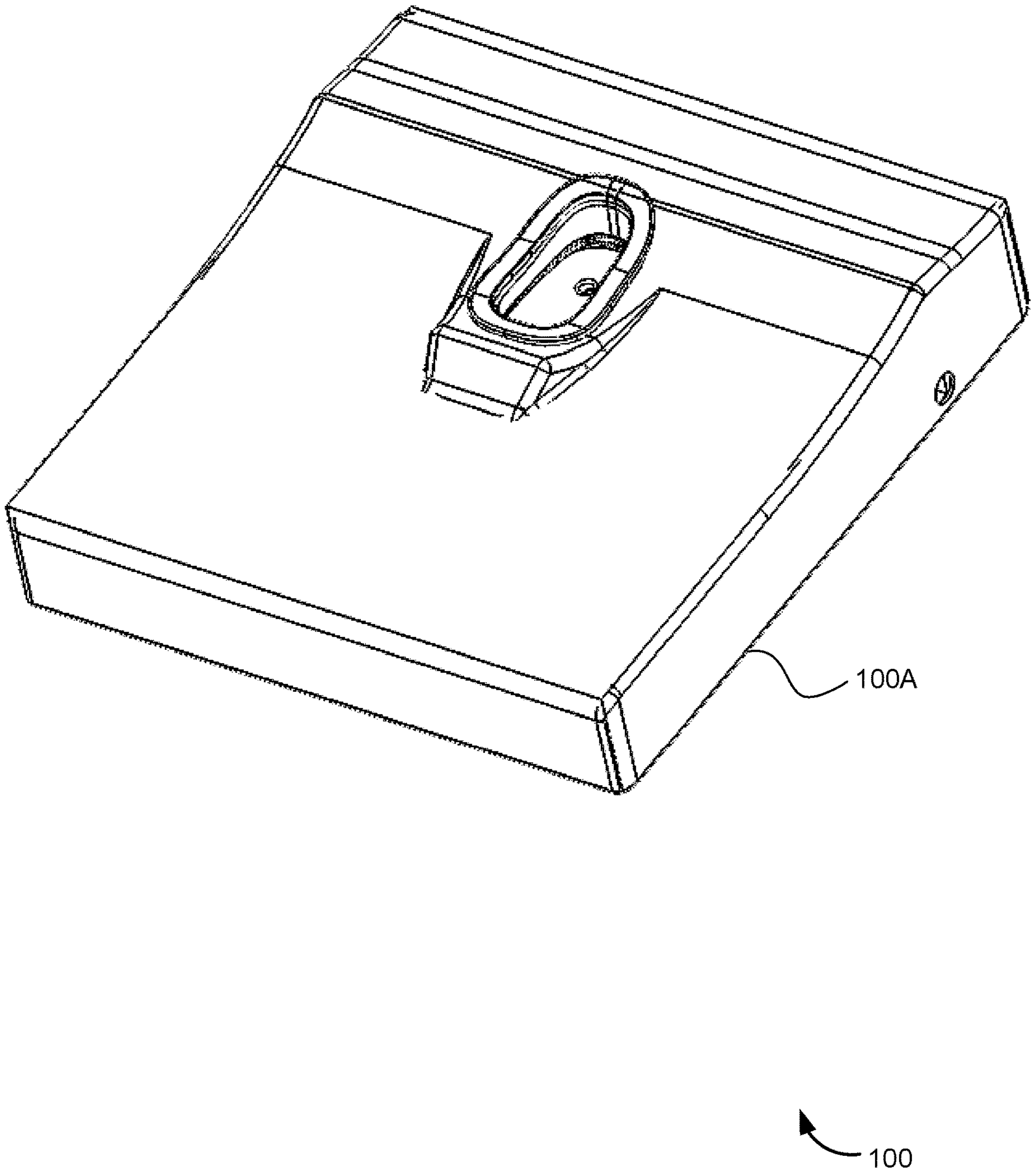
FIG. 1 is an exemplary illustration 100 of a female urination assistance apparatus for physically disabled women according to the embodiments of the present disclosure.

The drawings described herein are for illustration purposes only and are not intended to limit the scope of the present subject matter in any way.

DETAILED DESCRIPTION

As discussed in the background section of the document, the present disclosure proposes a novel female urination apparatus that is specific to female users. For reference, as per the language of FDA, the disclosed device is known as non-indwelling urine drainage collection system. The apparatus assists females who are facing problems related to moving and are confined to one place to urinate conveniently. Further, this apparatus is portable and can be easily carried. Furthermore, this apparatus can be readily fixed in any chair or wheelchair. Furthermore, this apparatus can be even independently used by the individual who can dispose the stored urine without any external help. The apparatus provides a safe and hassle-free solution for women facing difficulties related to moving, to urinate and dispose the collected urine without depending on others. The primary advantage of the present invention over the prior arts is that it is designed specifically for female users keeping their physical and emotional requirements in mind. The tote bag provided herein that stores the urine collection bag makes sure that the urine bag is not directly visible to anyone thereby providing a sense of privacy and comfort to the user. Furthermore, the placement of the collection funnel, silicon support and the collection fittings make sure that the users need not move or change the configuration of the wheelchair when they urinate.

The unique design and structure of the cushioning system and the attached funneling system provides a safe and secure solution for the problems faced by disabled women who are bound to wheelchairs for extended period of time. The apparatus reduces the instances of infections as well since the solution provided is safe and hygienic. It allows the users to take care of their needs with respect to urination and disposal by themselves thereby empowering them and reducing dependence on a third party such a caretaker.

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments maybe utilized and that changes may be made without departing from the scope of the present invention. The following detailed description is, therefore, not to be taken in a limited sense, and the scope of the present invention is defined only by the appended claims.

The specification may refer to "an", "one" or "some" embodiment(s) in several locations. This does not necessarily imply that each such reference is to the same embodiment (s), or that the feature only applies to a single embodiment. A single feature of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout this document, the term "apparatus", "device" and "assembly", may be used interchangeably while referring to the female urination apparatus as proposed by the present disclosure. Similarly, the terms "collection tubing", "collection tube", and "connectors" may be used interchangeably while referring to the collection tube used in the apparatus disclosed herein. It may be noted that the terms used herein do not restrict the scope of the present subject matter. The terms are used interchangeably depending on the context of the sentence.

According to an embodiment of the present disclosure a novel female urination apparatus that can be placed on a chair for women is disclosed. The apparatus comprises of a base layer, a lower foam assembly, collection fittings, a silicon support, a collection funnel, an upper foam assembly, a flap closure cover with gel insert, a urine collection bag and a tote bag.

The base layer interfaces with the chair and provides the template for the entire apparatus. The base layer is primarily a semi-rigid flat structure that provides stability to the lower foam assembly. This base layer is also responsible for ensuring proper spacing between the lower foam assembly components for placement of collection fittings.

The lower foam assembly is a set of cut foam components that are semi-permanently adhered to the base layer of the apparatus. The semi-permanent adhesion methods that can be employed include Velcro. Semi-permanent tape or any method known a person having ordinary skill in the art. The lower foam assembly includes a plurality of channels for positioning of the collection tube. The option of plurality of channels provides different configurations for the collection tube outlet portions. Moreover, this enables the user using the apparatus or the caretaker to select the exit locations, viz., side left, side right, rear left, rear right exits which can be done based on the appropriate position of the user without any change in the sitting position or comfort of the user. This is especially useful for the user who may not have a symmetrical sitting posture. Also, the channel size and the width of the foam components of the lower foam assembly are so fashioned that it helps to retain collection fittings without any unintended flow restrictions during different positions of the user, like sitting down, getting up, repositioning and other slight motions which may occur due to change in activities of the user, e.g., reaching for objects, stretching etc.

The collection fittings are disposed of in the lower foam assembly which provides a plurality of configurations. The collection fittings include an inlet portion, outlet portion and a collection tube. The inlet portion is generally a press-fit medical grade plastic barb tube fitting, the collection tube again is made of medical grade tubing and the outlet portion comprises of a quick disconnect tube fitting. The urine is collected through the inlet portion and transferred to the outlet portion through the collection tube. The quick disconnect tube fitting on the outlet portion mates with the quick disconnect tube fitting of the urine collection bag. The collection fittings are generally assembled as per the convenience of the user and by fixing the configuration of the exit location in the lower foam assembly, both convenience and comfort of the user can be optimized. The configurations of the collection fittings can be easily adjusted through the cut foam elements of the lower foam assembly which are semi-permanently attached to the base layer.

The silicon support is provided to securely enclose the inlet portion of the collection fittings. The silicon support is a boat-shaped structure made of medical grade silicon which is permanently attached to the lower foam assembly. The collection funnel, a medical grade silicon mesh structure, is retained in the silicon support and has an opening for the outflow of urine in the middle portion. Due to the stronger structure of the silicon support, the collection funnel is maintained in its position which also leads to collection funnel to comfortably flex with the waterproof cover which interfaces with the user's body. The upper foam assembly is again a set of cut foam components with a fixed central opening for the positioning and retention of the silicon support, the collection funnel and the flap closure cover with gel insert. The rear portion of the upper foam assembly is raised above the front portion in an inclined manner. This provides additional comfort and support in the rear sitting area to the user which typically experiences higher sitting pressures. The upper foam assembly is permanently affixed to the lower foam assembly. The cut foam components of both the upper and lower foam assembly are made of high-density open cell foam. Further, the geometry of the cut foam pieces of the upper foam assembly are fashioned in a very specific manner to provide comfort and reduce pressure areas such as a waterfall front and extra foam in the rear side for extra relief. Moreover, the foam material used and the geometric properties of the same provide extended cyclical use for longer duration. Also, the foam material can have varied configurations in different dimensions to suit the need of the user based on the size of the chair.

The apparatus is covered with a flap closure cover with gel insert which securely wraps the assembly, provides a liquid proof surface to the user. The flap closure cover with gel insert promotes healing. The flap cover allows easy access to each collection outlet fitting position without removing or adjusting the flap closure cover. Also, the flap closure cover provides access to the user or the caretaker to the collection fittings of the apparatus for cleaning or replacing any of the fittings. The flexible support together provided by the silicon support, collection funnel and the upper foam assembly maintain the structure intact and also prevents any inconvenience to the user. The collection funnel is permanently affixed to the liquid-proof flap closure cover with gel insert for preventing inadvertent leakage. The gel insert provides an interface between the user and the apparatus. Due to the organic nature of the gel insert, the outer surface does not have a fixed shape and modifies as per the shape of the weight over the surface. Therefore, this structure maintains the contact with the user without any undue pressure points that could result in discomfort or pressure sores for the user. The gel insert is permanently attached to the flap closure cover and the fabric of the flap closure cover is flexible, liquid-proof and sturdy.

The urine collection bag (no drawings are provided) is in connection with the outlet portion of the collection fittings to collect the urine. This urine collection bag has a push valve that aids in drainage of the collected urine from the collection tubing. The urine collection bag may be replaced and/or cleaned as preferred by the user at regular intervals. The urine collection bag is placed in a tote bag (no drawings are provided) which is hung onto the chair. This assembly makes sure that the urine collection bag isn't revealed outside.

Before moving to the succeeding sections of this disclosure, it is pertinent to refer to various reference numbers provided in the drawings.

Figure 2:
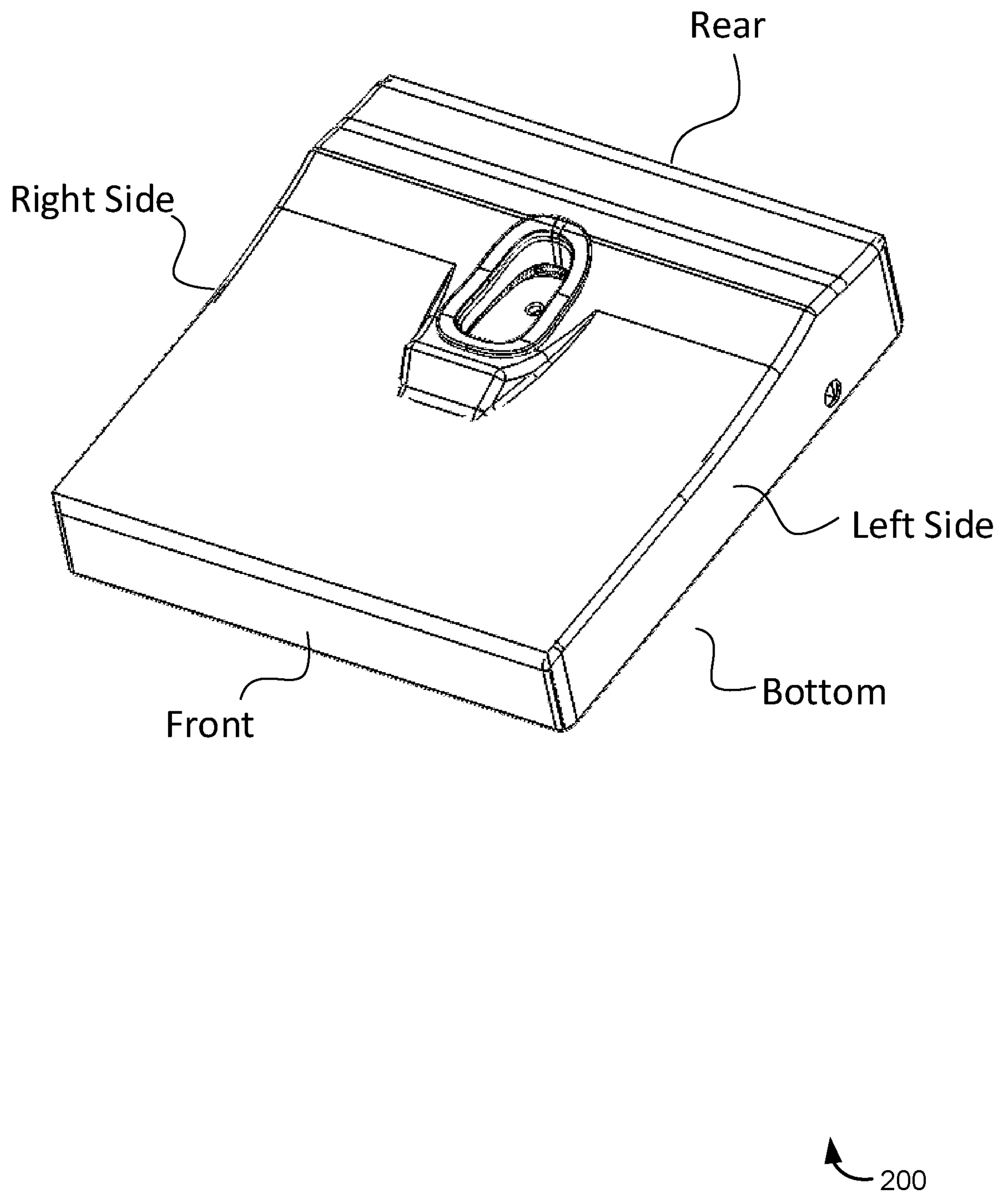
FIG. 2 is another exemplary illustration 200 of the female urination assistance apparatus for physically disabled women according to the embodiments of the present disclosure.

FIGS. 1 and 2 are exemplary illustrations 100 and 200 respectively of the top plane and the top side of the female urination apparatus 100A according to the embodiments of the present disclosure. The female urination assistance apparatus 100A may be placed directly onto a chair or a generic wheelchair. The apparatus may be designed in different shapes and sizes depending on the requirements of the user. The top view of 100 shows the inclined surface of the apparatus with a higher rear back side than the front side, an outlet is visible on the left side of the apparatus. The middle of the apparatus shows a collection funnel with an inlet opening in the middle.

Figure 3:
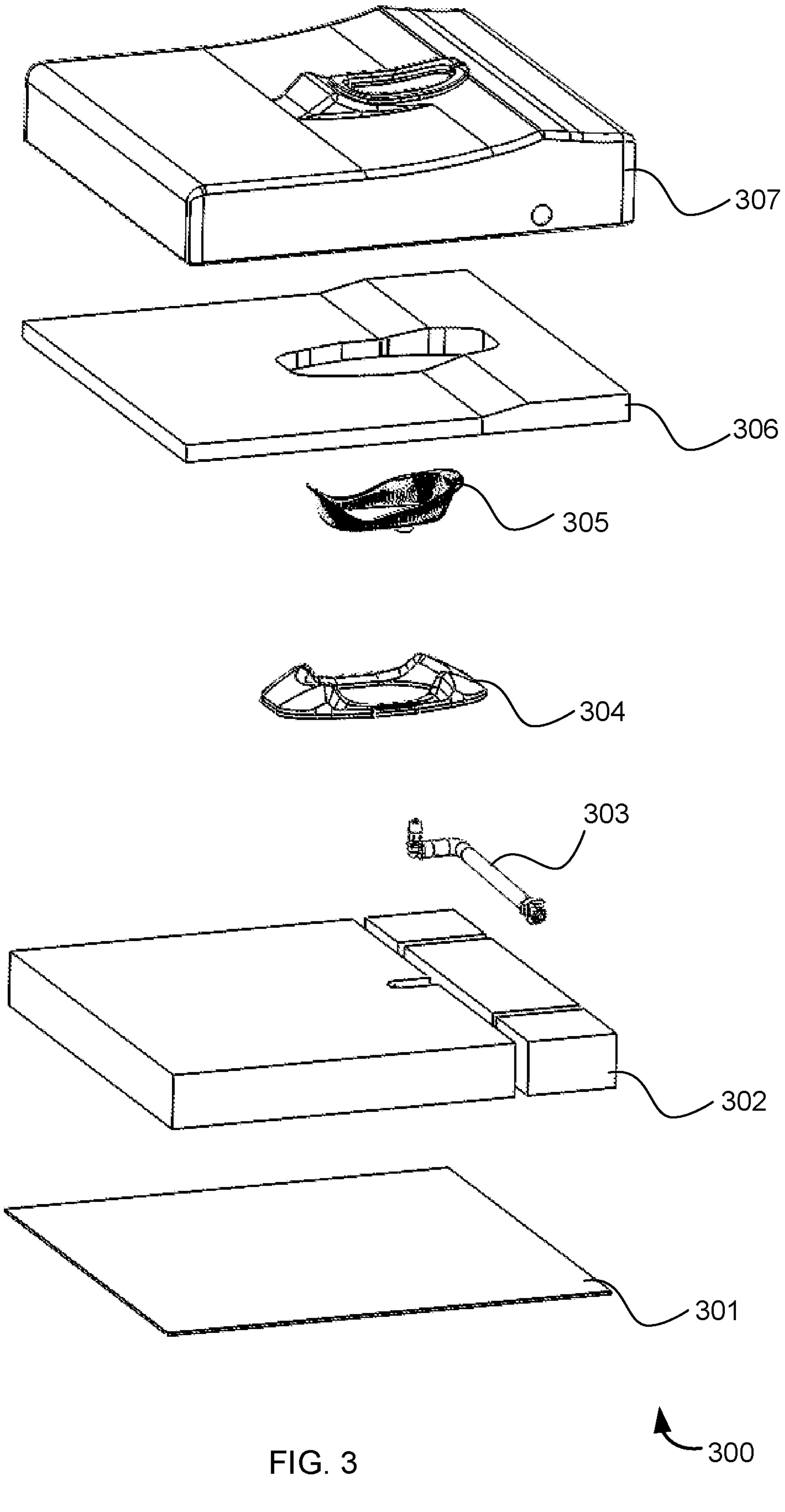
FIG. 3 is an exploded view 300 of all the components of the female urination assistance apparatus according to the embodiments of the present disclosure.

FIG. 3 is an exemplary illustration 300 of the female urination apparatus 100 showing all the components of the apparatus. The apparatus comprises of a base layer 301, lower foam assembly 302, collection fittings 303, silicon support 304, collection funnel 305, upper foam assembly 306 and a flap closure cover with gel insert 307. The base layer 301 forms the template for all other components, the lower foam assembly 302 houses the collection fittings 303. On the top portion of the lower foam assembly 302, the silicon support 304 is fixed. The silicon support 304 is a boat shaped structure. The collection funnel 305 is fixed on the silicon support 304. The upper foam assembly 306 adheres to the lower foam assembly 302. Additionally, the upper foam assembly 306 has an opening for fixing of the silicon support 304 along with the collection funnel 305. The rear back side of the upper foam assembly 306 is at an inclined position to the front side. The entire assembly is covered by a flap closure cover with gel insert 307. The flap closure cover with gel insert 307 is clearly seen to have provision for the collection funnel with silicon support.

Figure 4:
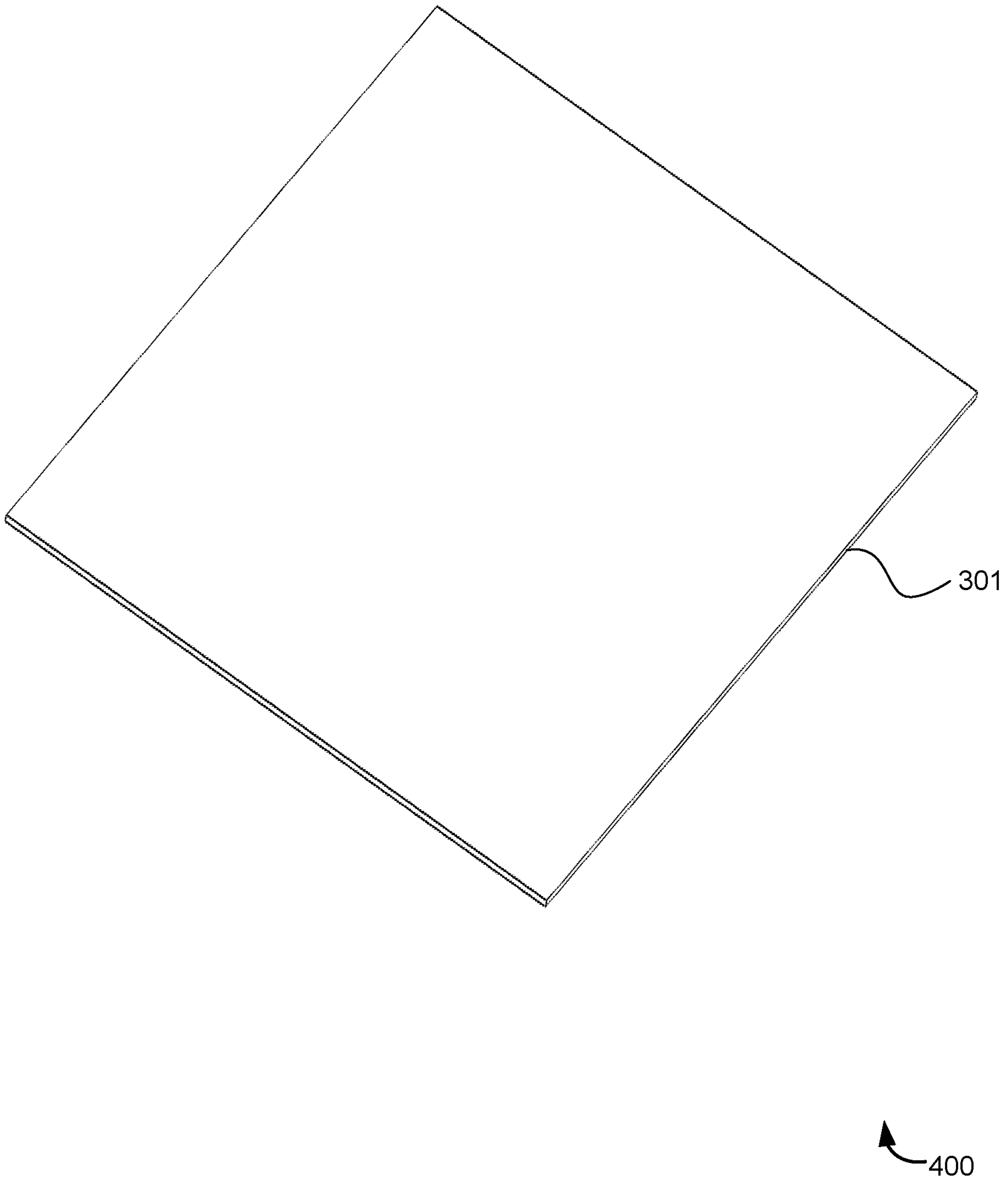
FIG. 4 is an exemplary depiction 400 of the base layer 301 of the female urination assistance apparatus according to the embodiments of the present disclosure.

FIG. 4 is an exemplary illustration 400 of the base layer 301 of the female urination assistance apparatus. The base layer 301 interfaces with the chair and provides the template for the entire apparatus. The base layer 301 is primarily a semi-rigid flat structure that provides stability to the lower foam assembly. This base layer 301 is also responsible for ensuring proper spacing between the lower foam assembly components for placement of collection fittings.

Figure 5:
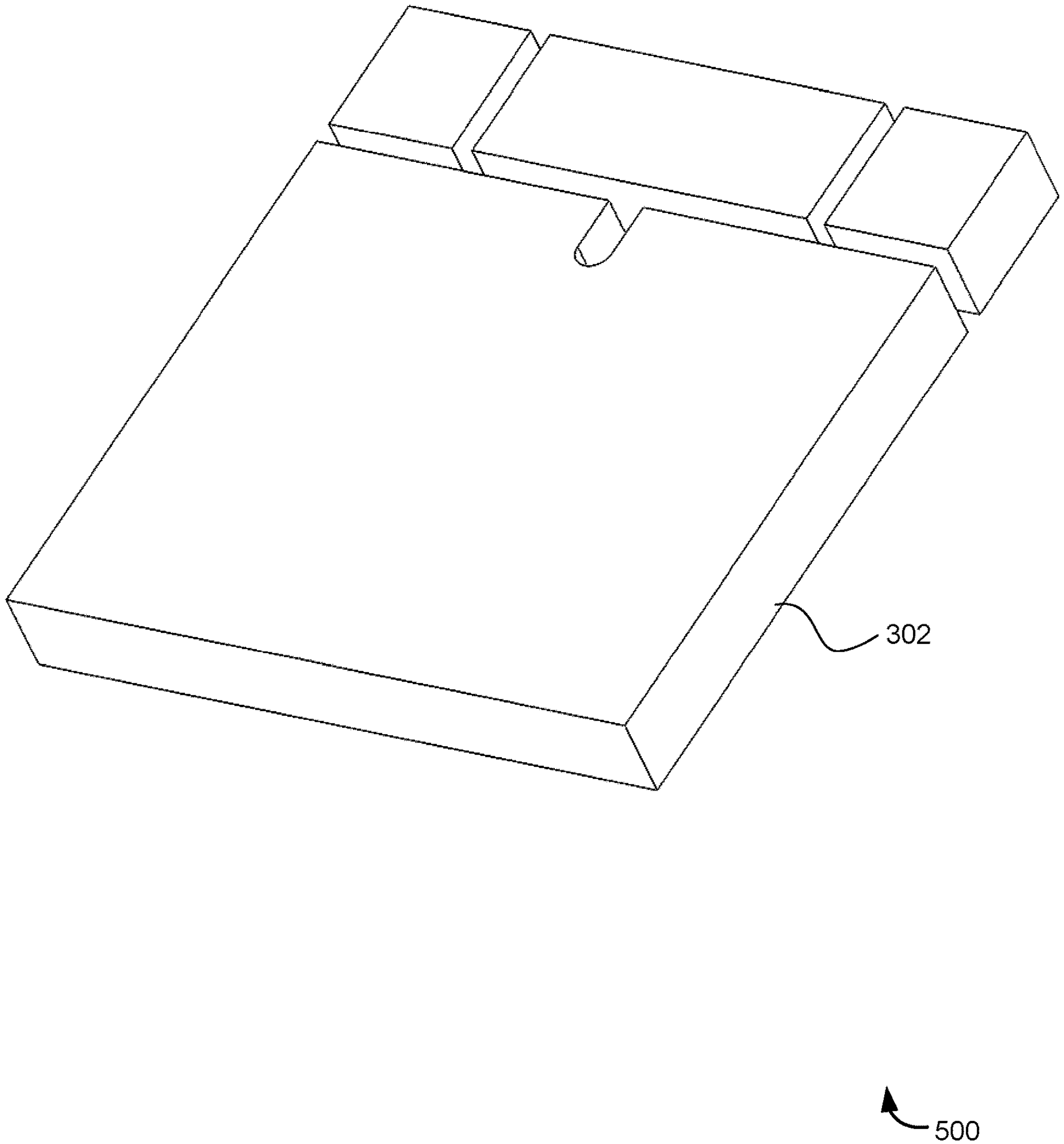
FIGS. 5, 6 and 7 are exemplary depictions 500, 600 and 700 respectively of the lower foam assembly of the female urination assistance apparatus according to the embodiments of the present disclosure.
Figure 6:
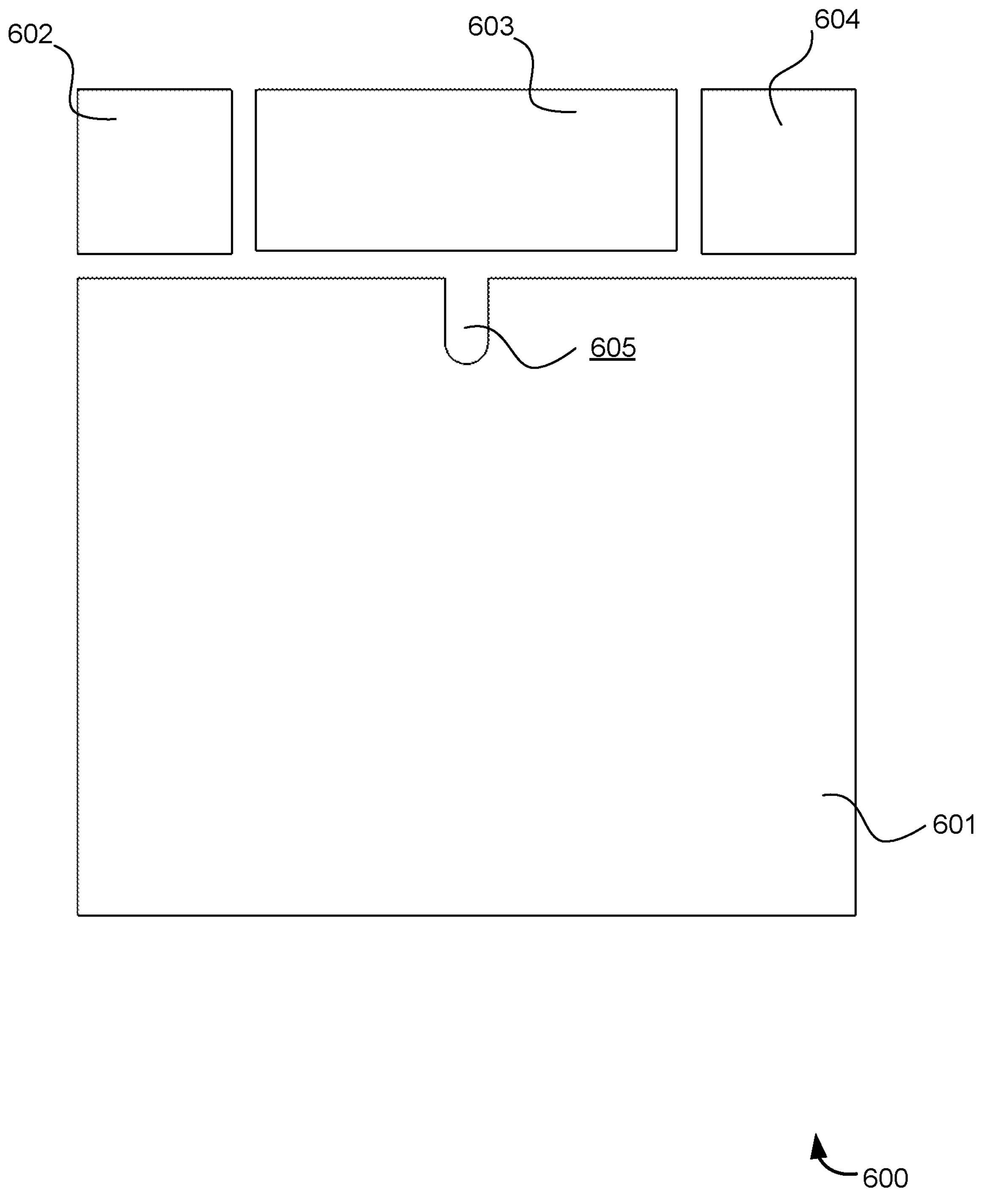
Figure 7:
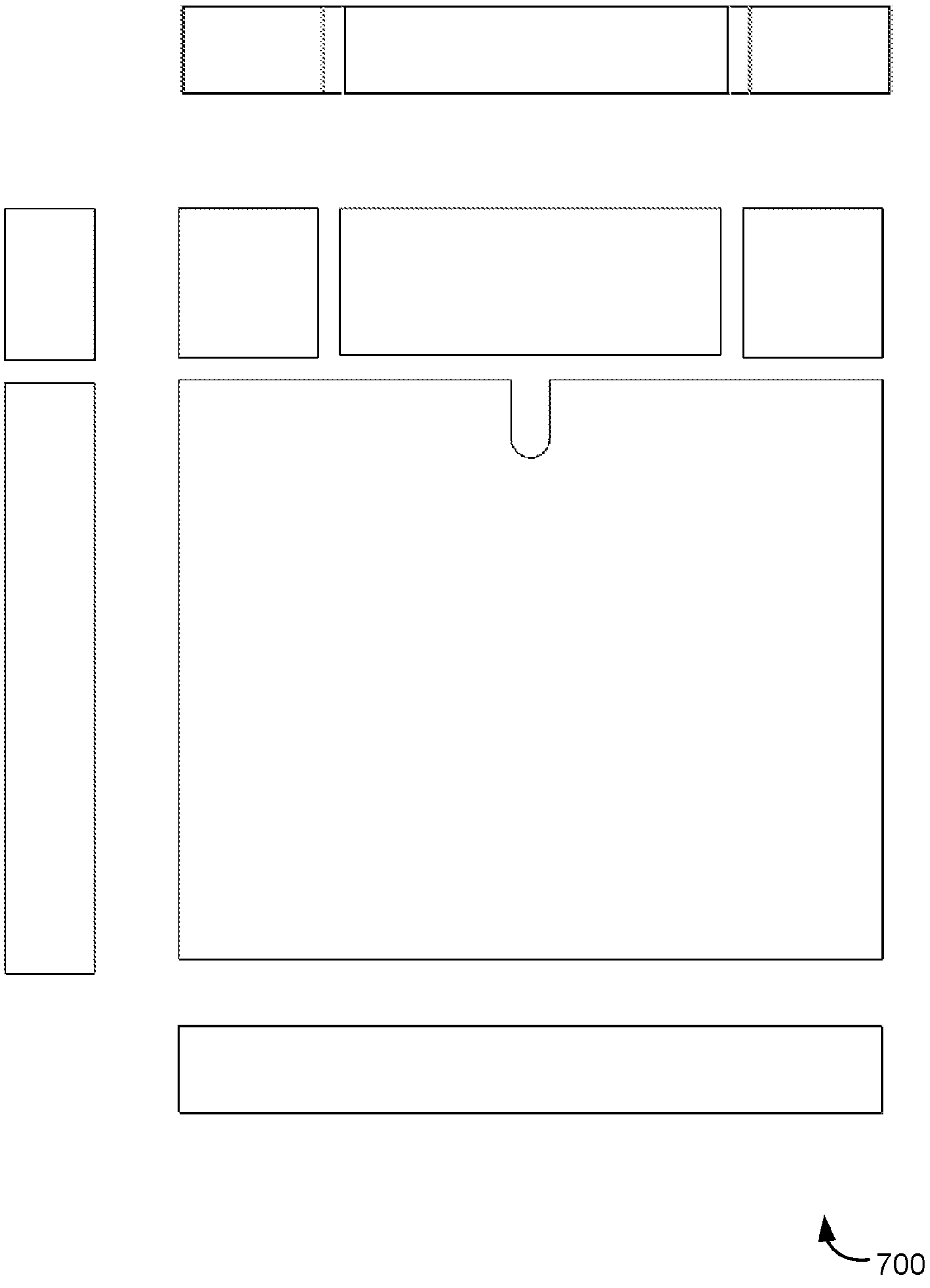

FIGS. 5, 6 and 7 are exemplary depictions 500, 600 and 700 respectively of the lower foam assembly 302 of the female urination assistance apparatus according to the embodiments of the present disclosure. The lower foam assembly is a set of cut foam components 601, 602, 603, 604 that are semi-permanently adhered to the base layer of the apparatus and an opening 605 for fixing the inlet portion of the collection fittings. The gaps between the cut foam components 601, 602, 603 and 604 provides space for plurality of configurations of the collection tube depending on the outlet point chosen by the user or the caretaker. The provision for choosing the outlet portion helps the user to use the apparatus comfortably without changing the position. Further, this is useful for the users who do not have a symmetrical sitting position. Also, the channel size and width between the foam components are so maintained that the collection fittings are retained without any unintended flow restrictions during different positions of the user.

Figure 8:
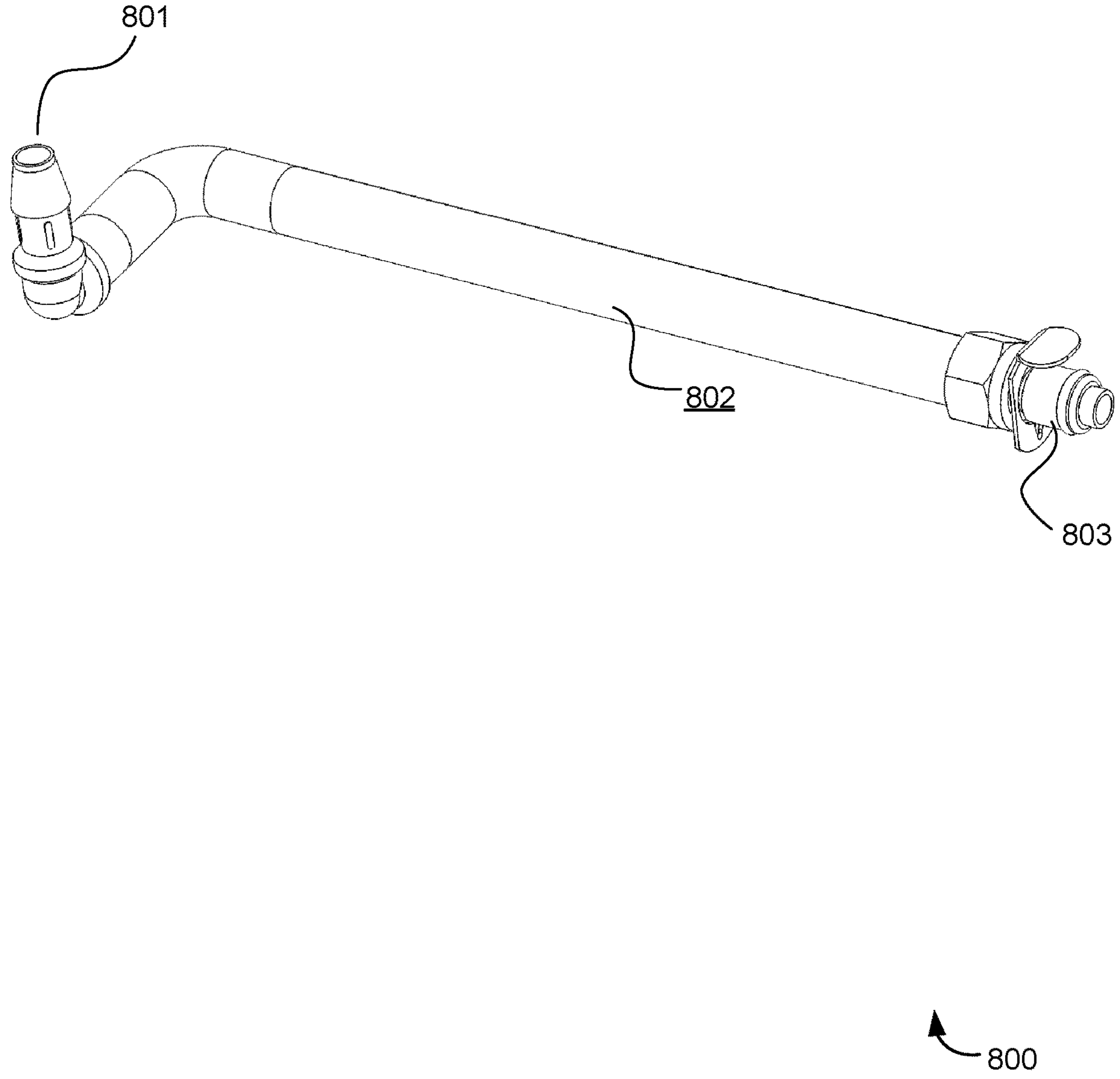
FIGS. 8, 9 and 10 are exemplary depictions 800, 900 and 1000 respectively of the collection fittings of the female urination assistance apparatus according to the embodiments of the present disclosure.
Figure 9:
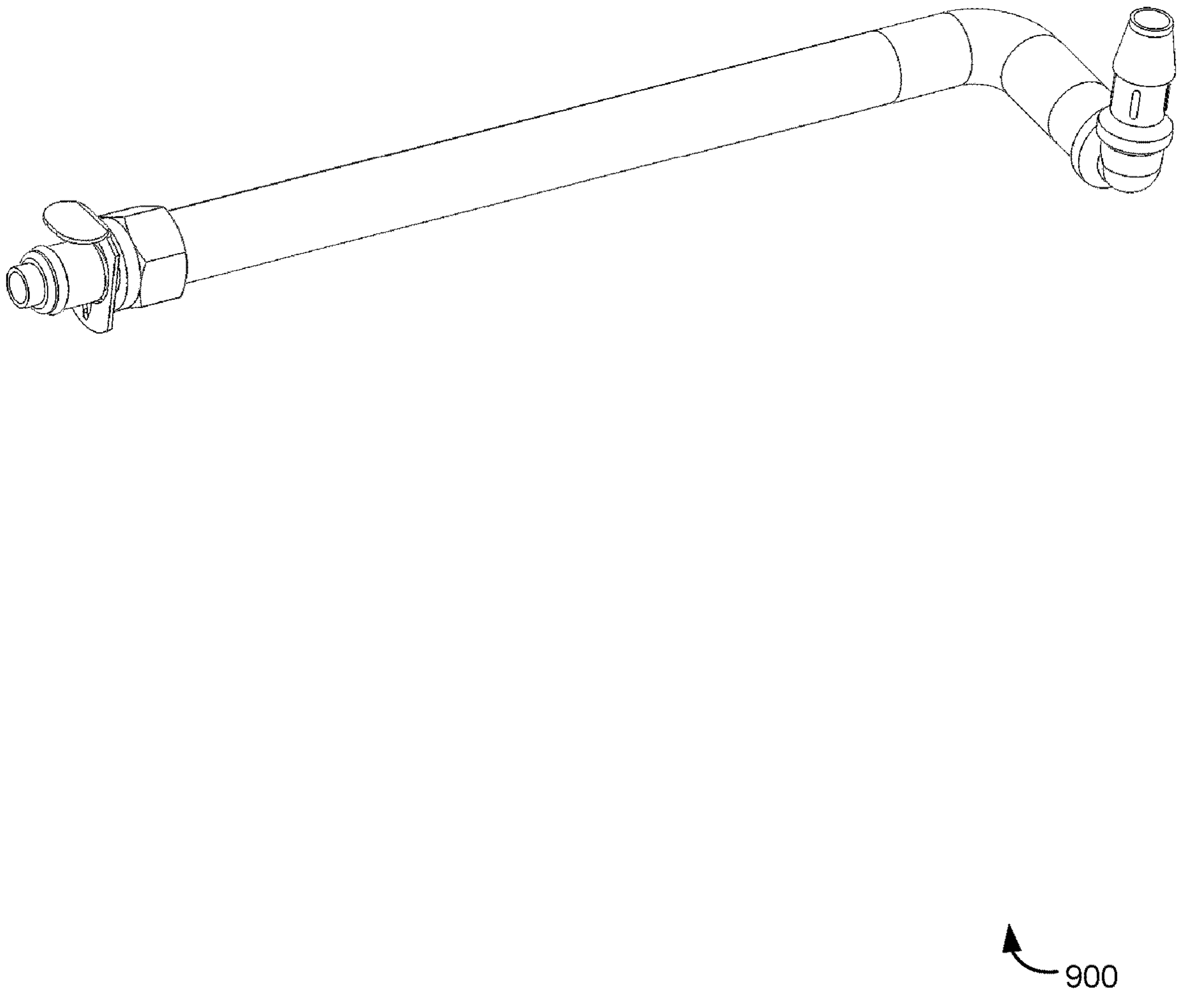
Figure 10:
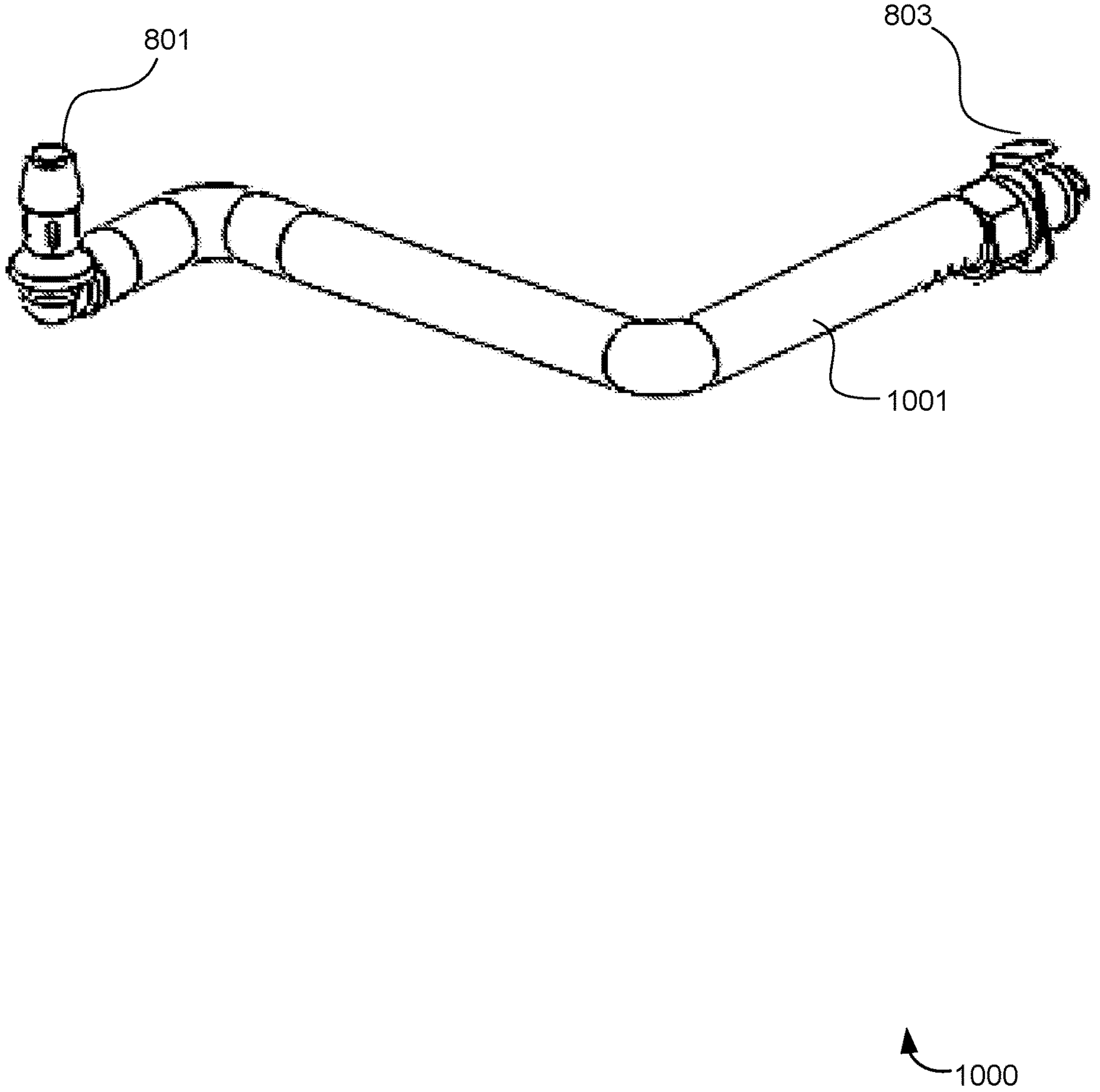

FIGS. 8, 9 and 10 are exemplary depictions 800, 900 and 1000 respectively of the collection fittings of the female urination assistance apparatus according to the embodiments of the present disclosure. The collection fittings 303 comprises of an inlet portion 801, a collection tube 802 and an outlet portion 803. The collection tube may be extended by adding addition tube 1001 depending on the outlet portion chosen by the user or the caretaker. The outlet portion 803 comprises of a quick disconnect tube fitting which mates with the quick disconnect tube fitting of the urine collection bag. The collection fittings 303 comprising of the parts 801, 802, 803 can be easily adjusted through the cut foam elements of the lower foam assembly which are semi-permanently attached to the base layer.

Figure 11:
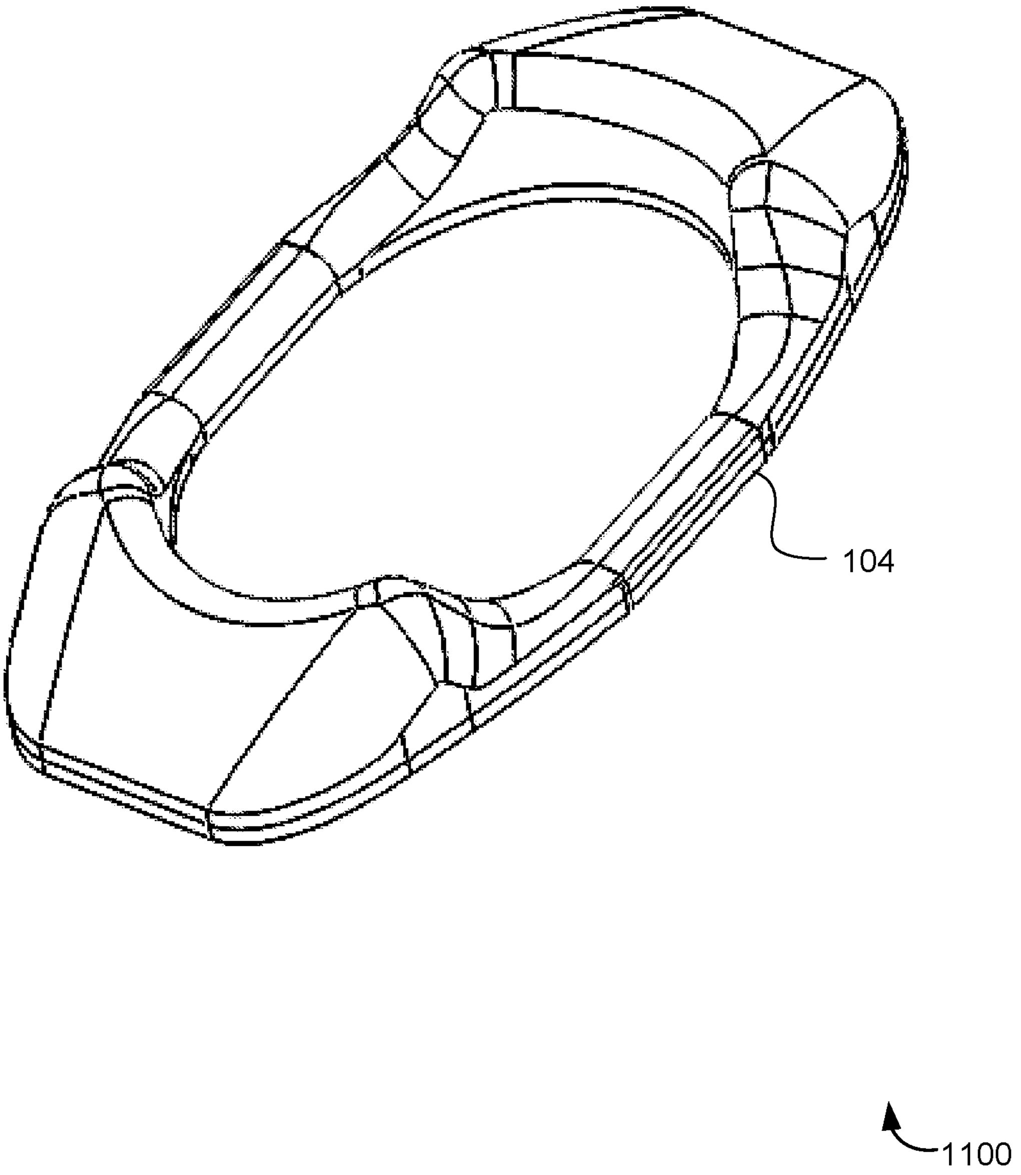
FIG. 11 is an exemplary depiction 1100 of the silicon support of the female urination assistance apparatus according to the embodiments of the present disclosure.

FIG. 11 is an exemplary depiction 1100 of the silicon support 104 of the female urination assistance apparatus according to the embodiments of the present disclosure. The silicon support is a rigid boat shaped ring like structure having broad rear ends, thinner left and right edges and a provision in the middle for fixing of the collection funnel. The silicon support 104 may be made up of medical grade silicon and is permanently attached to the lower foam assembly.

Figure 12A:
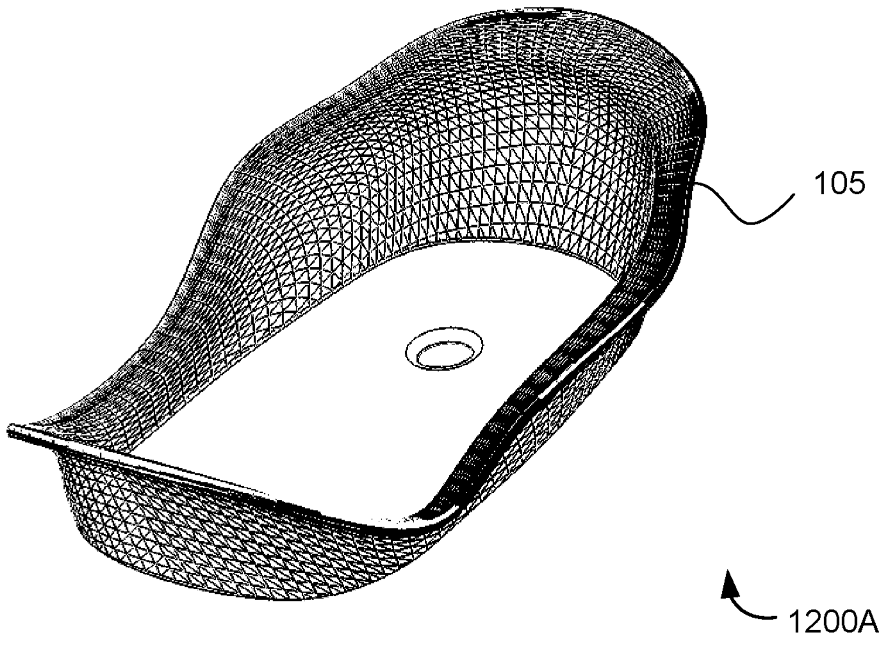
FIGS. 12A and 12B are exemplary depictions 1200A and 1200B respectively of the collection funnel of the female urination assistance apparatus according to the embodiments of the present disclosure.
Figure 12B:
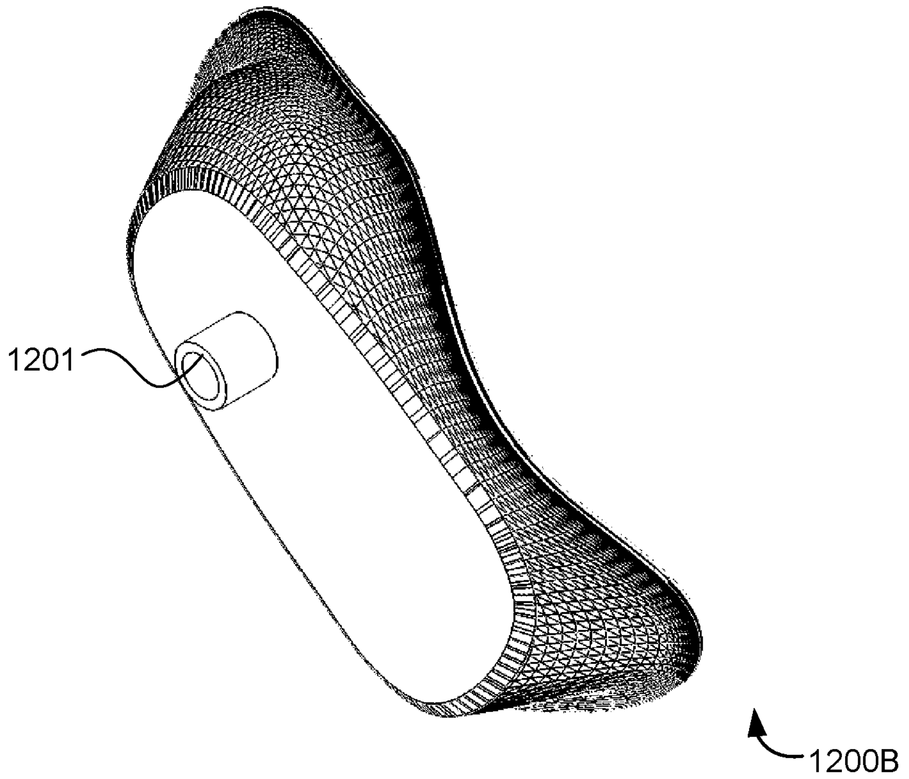

FIGS. 12A and 12B are exemplary depictions 1200A and 1200B respectively of the collection funnel of the female urination assistance apparatus according to the embodiments of the present disclosure. The collection funnel 105 is a boat shaped mesh structure on the sides and a flat bottom, made up of medical grade silicon. The collection funnel has an opening 1201 in the middle for fixing the inlet portion of the collection fittings. The collection funnel 105 is retained in the silicon support 104. The combination of stronger structure of silicon support and flexible mesh shaped structure of collection funnel 105, the collection funnel is maintained at its position and it comfortably flexes with the liquid proof flap closure cover with gel insert which interfaces with the user's body.

Figure 13:
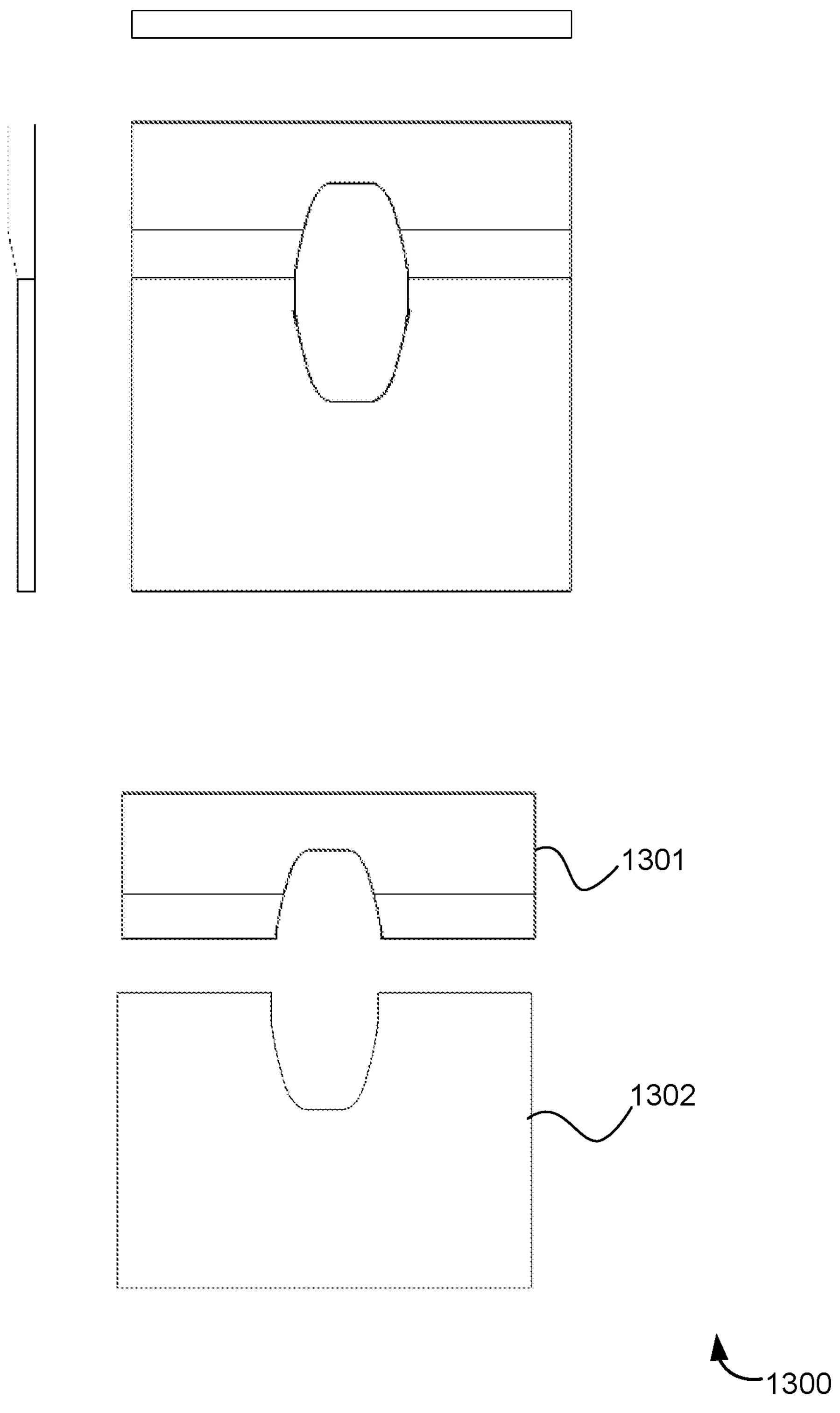
FIGS. 13 and 14 are exemplary depictions 1300 and 1400 respectively of the upper foam assembly of the female urination assistance apparatus according to the embodiments of the present disclosure.
Figure 14:
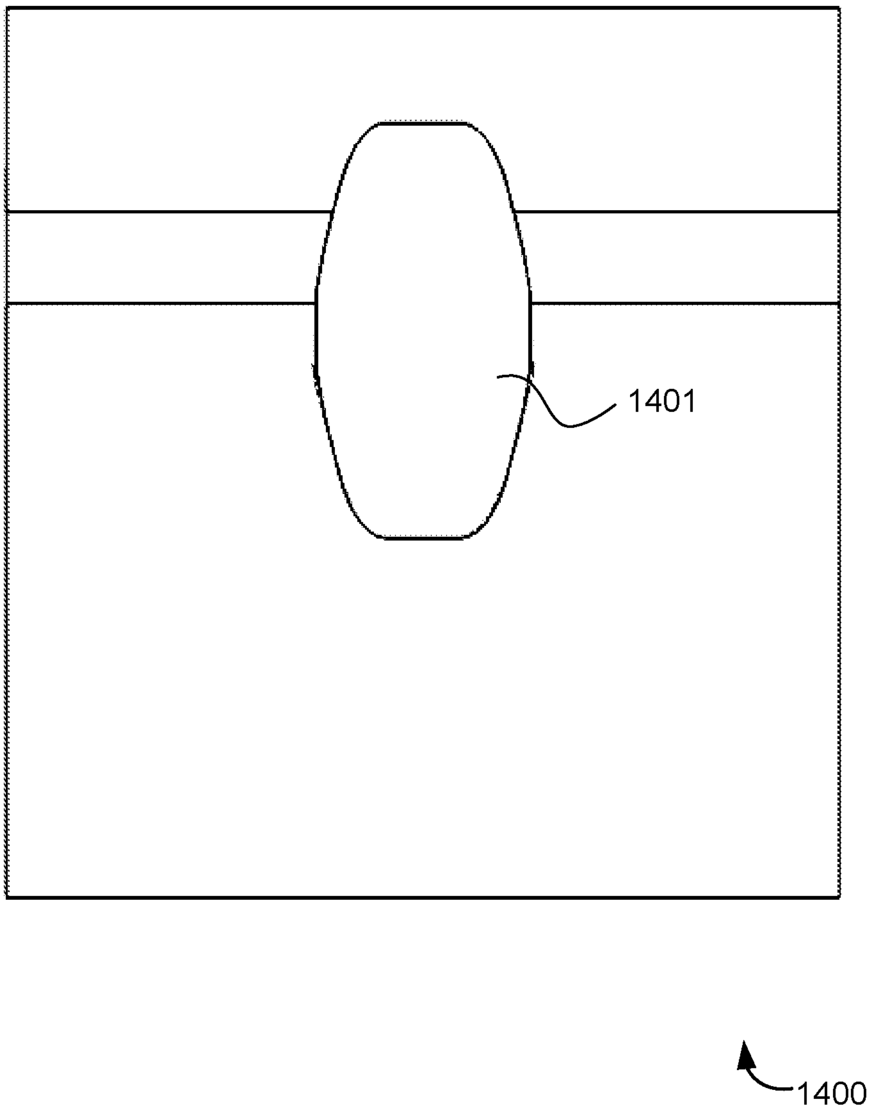

FIGS. 13 and 14 are exemplary depictions 1300 and 1400 respectively of the upper foam assembly 306 of the female urination assistance apparatus according to the embodiments of the present disclosure. The upper foam assembly is again a set of cut foam components 1301 and 1302 which when combined form a fixed central opening 1401 for the positioning and retention of the silicon support, the collection funnel and the flap closure cover with gel insert. The cut foam component 1301 of the upper foam assembly is a bit thicker and bigger that the cut foam component 1302. This leads to rear portion 1301 being raised above the front portion of the upper foam assembly 1302 in an inclined manner. This provides additional comfort and support in the rear sitting area to the user which typically experiences higher sitting pressures. The upper foam assembly is permanently affixed to the lower foam assembly. The cut foam components of both the upper and lower foam assembly may be made of high-density open cell foam.

Figure 15:
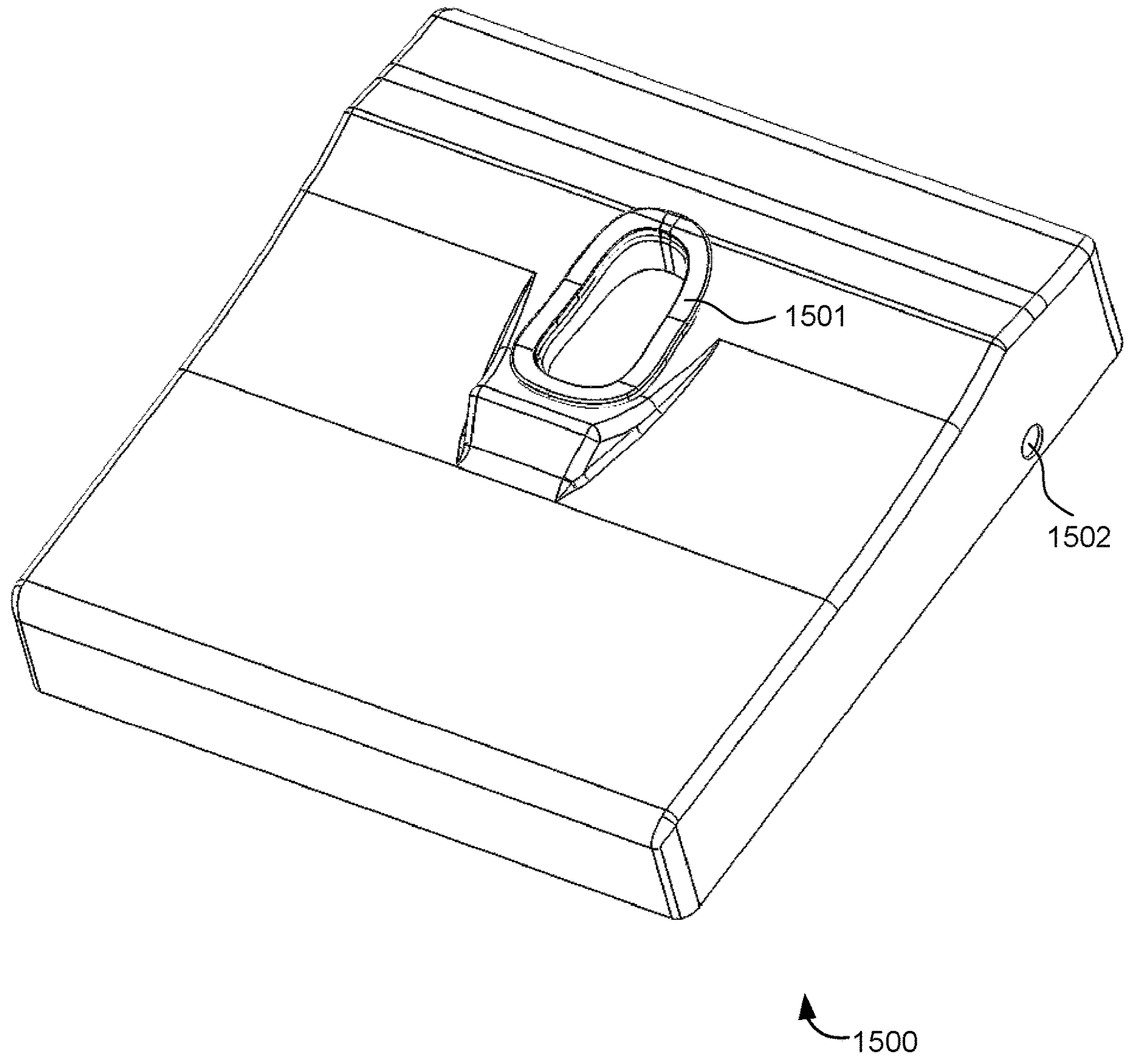
FIGS. 15,16 and 17 are exemplary depictions 1500, 1600 and 1700 respectively of the flap closure cover with gel insert of the female urination assistance apparatus according to the embodiments of the present disclosure.
Figure 16:
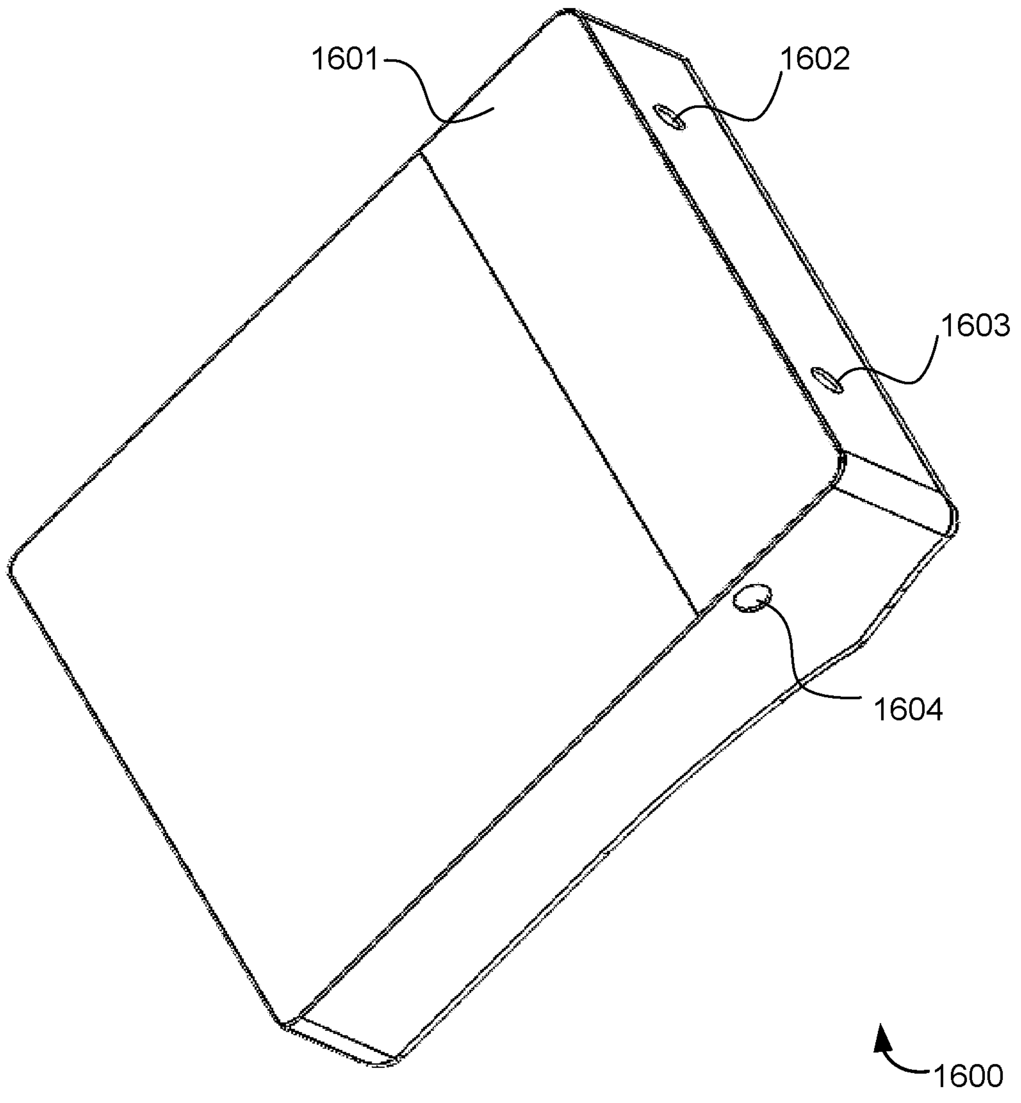
Figure 17:
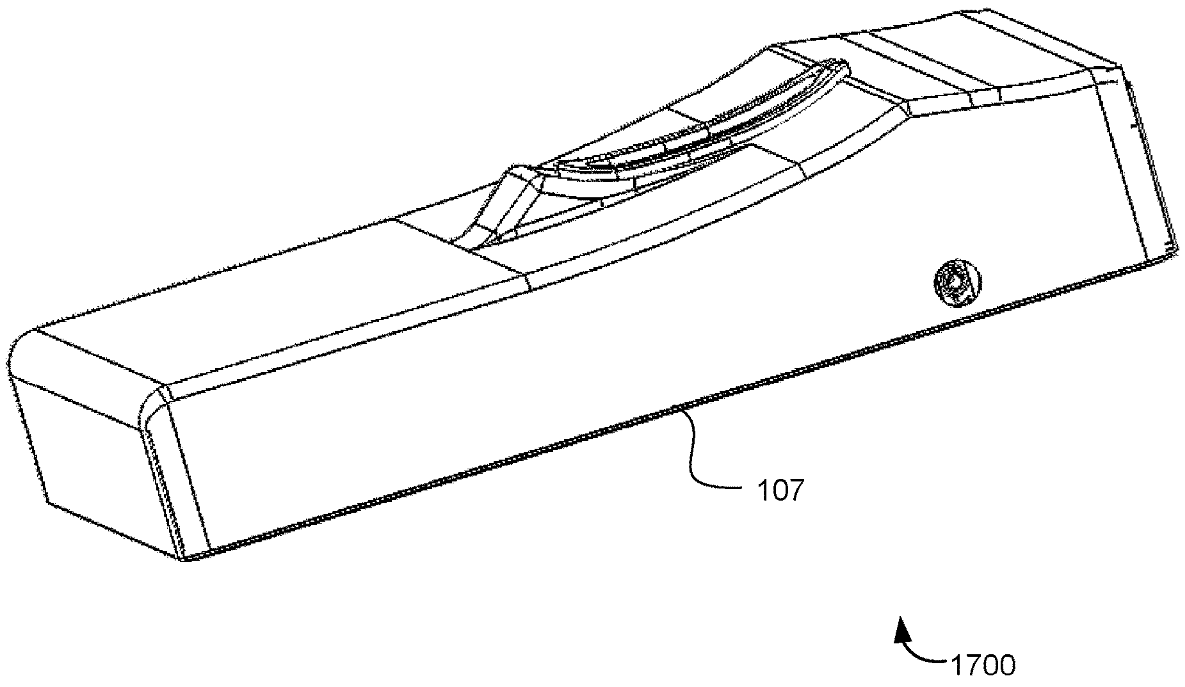

FIGS. 15,16 and 17 are exemplary depictions 1500, 1600 and 1700 respectively of the flap closure cover with gel insert 307 of the female urination assistance apparatus according to the embodiments of the present disclosure. The illustration 1500 provides the top view of the flap closure cover with gel insert. The top portion shows the structure with collection funnel and silicon support 1501 and the outlet portion 1502 of the collection fittings. The other outlets 1602, 1603 and 1604 for the outlet portion of the collection fittings are provided in the flap closure cover with gel insert. The back side of the flap closure cover is 1601 which keeps the flap closure cover intact. FIG. 17 shows a side view of the flap closure cover with gel insert. The flexible support together provided by the silicon support, collection funnel and the upper foam assembly maintain the structure intact and also prevents any inconvenience to the user. The collection funnel is permanently affixed to the liquid-proof flap closure cover with gel insert for preventing inadvertent leakage. The gel insert provides an interface between the user and the apparatus. Due to the organic nature of the gel insert, the outer surface does not have a fixed shape and modifies as per the shape of the weight over the surface. Therefore, this structure maintains the contact with the user without any undue pressure points that could result in discomfort or pressure sores for the user. The gel insert is permanently attached to the flap closure cover and the fabric of the flap closure cover is flexible, liquid-proof and sturdy.

Figure 18:
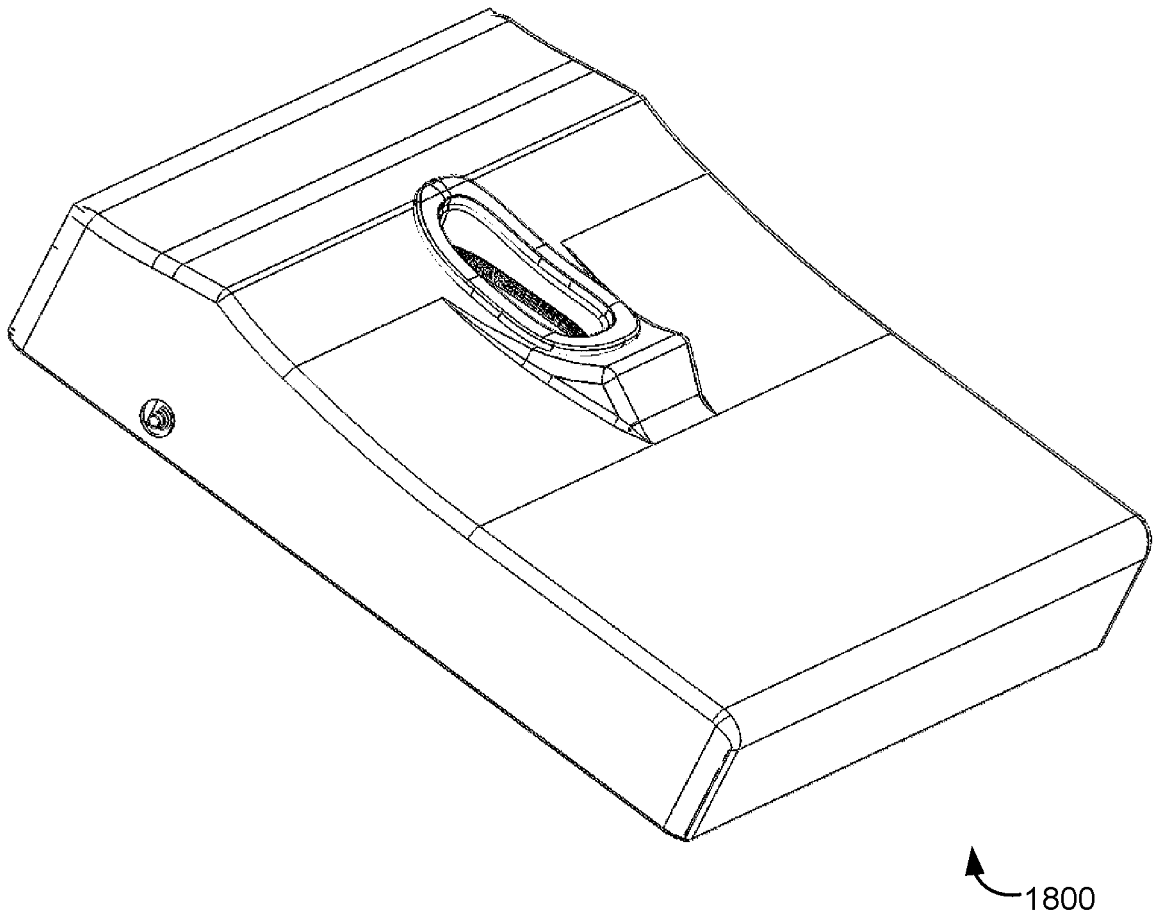
FIGS. 18, 19 and 20 are exemplary illustrations 1800, 1900 and 2000 respectively of the outlet portion of the collection fittings of the female urination assistance apparatus according to the embodiments of the present disclosure.
Figure 19:
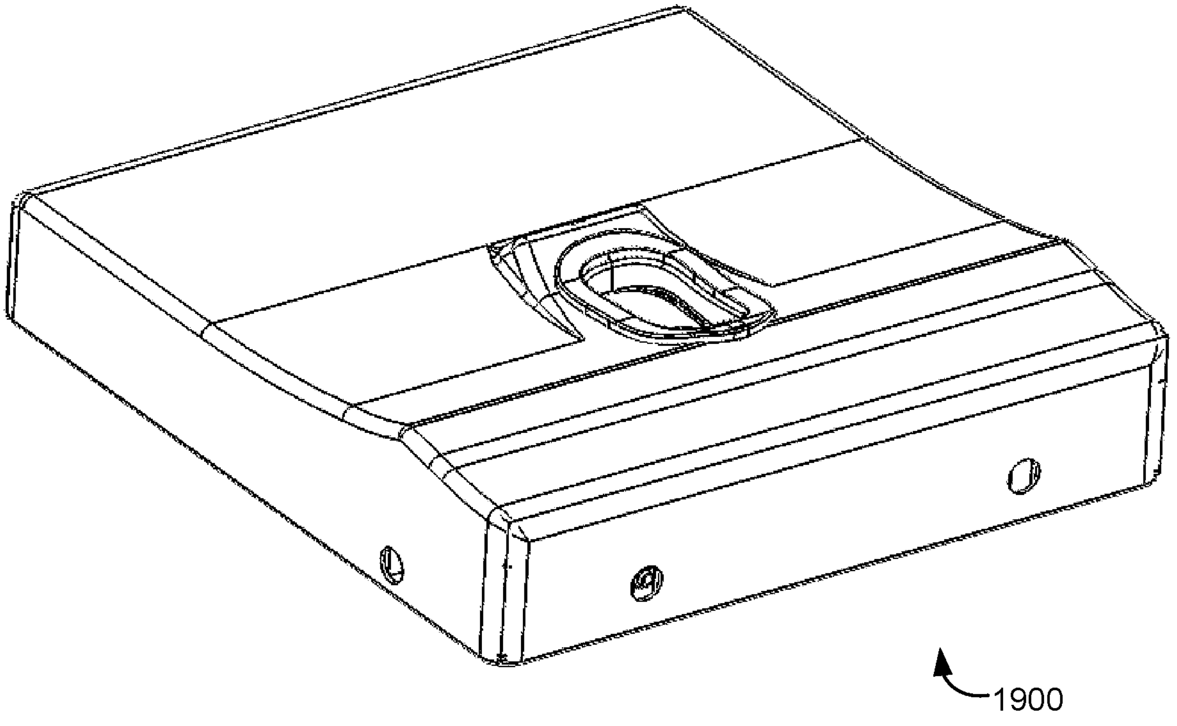
Figure 20:
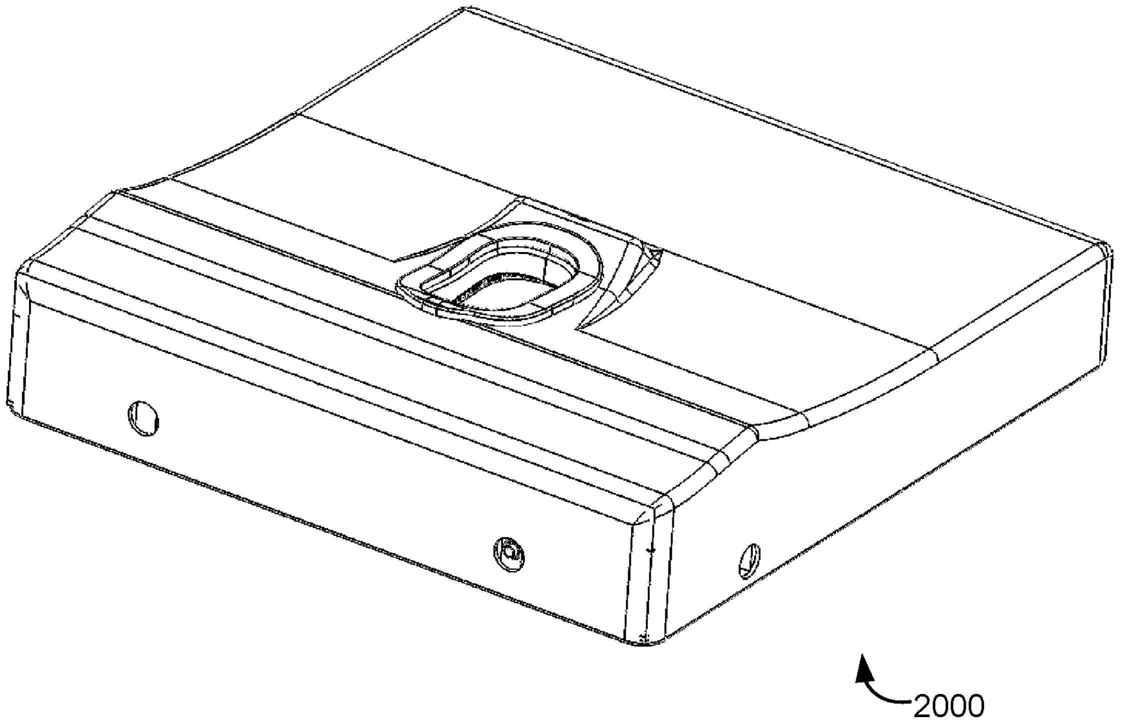

FIGS. 18, 19 and 20 are exemplary illustrations 1800, 1900 and 2000 respectively of the outlet portion of the collection fittings of the female urination assistance apparatus according to the embodiments of the present disclosure. The collection fittings are generally assembled as per the convenience of the user and by fixing the configuration of the exit location in the lower foam assembly, both convenience and comfort of the user can be optimized. The configurations of the collection fittings can be easily adjusted through the cut foam elements of the lower foam assembly which are semi-permanently attached to the base layer.

Figure 21:
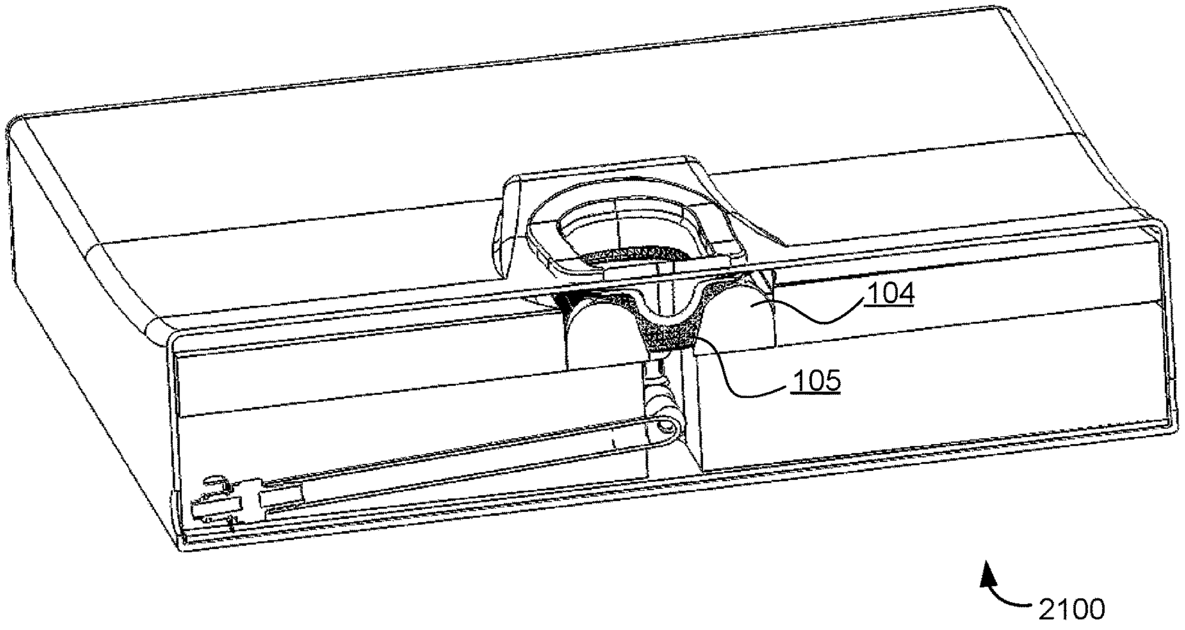
FIGS. 21, 22A and 22B are cross-sectional views 2100, 2200A and 2200B respectively of the female urination assistance apparatus according to the embodiments of the present disclosure.
Figure 22A:
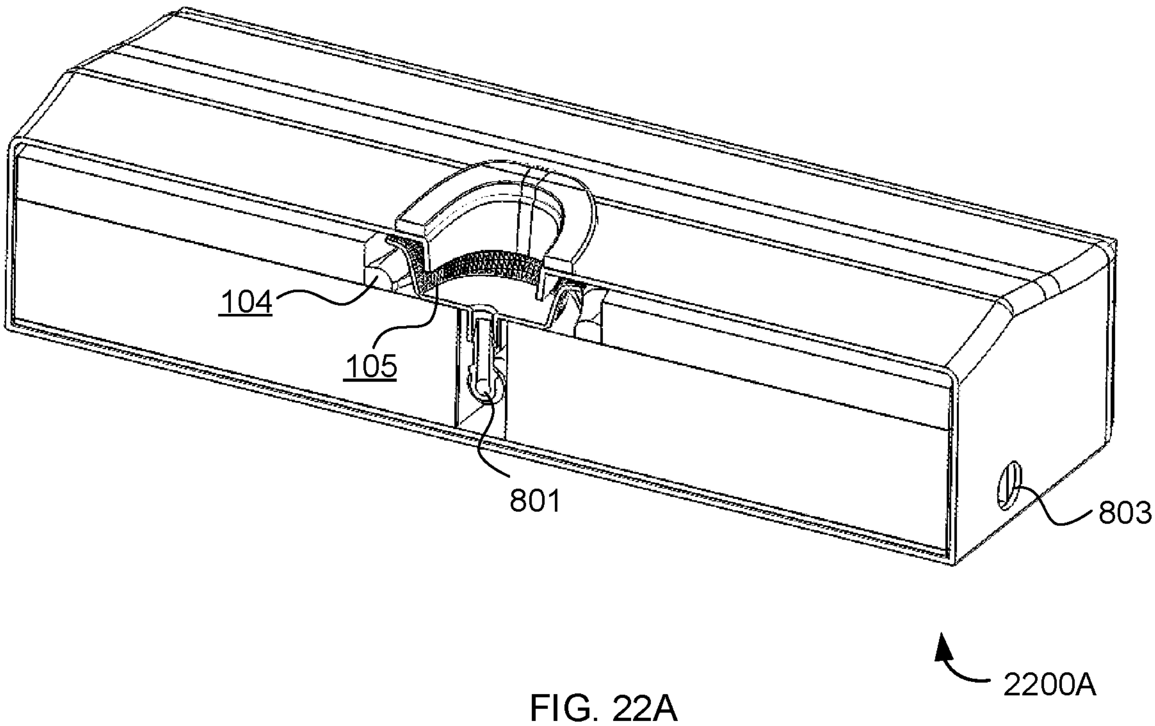
Figure 22B:
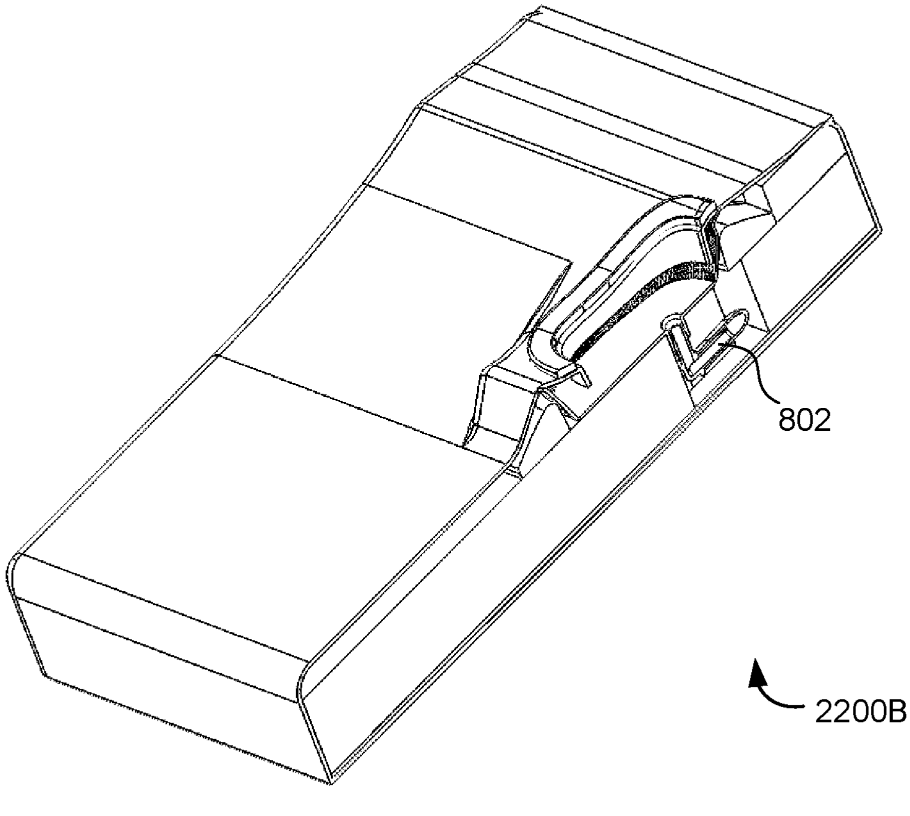

FIGS. 21, 22A and 22B are cross-sectional views 2100, 2200A and 2200B respectively of the female urination assistance apparatus according to the embodiments of the present disclosure. The cross sectional view 2100 shows the arrangement of collection funnel 105 which is placed on the silicon support 104. The opening of the collection funnel is attached to the inlet portion 801 of the collection fitting and the collection tube 802 connects the inlet portion 801 to the outlet in the side right of the apparatus for transferring the urine to the side right outlet 803. Similar arrangement may be made for transferring the urine to rear right or rear back of the apparatus depending on the option chosen by the user or the caretaker.

In one exemplary embodiment, the collection fitting may include a collection tube fitted on the left channel of the lower foam assembly. In another embodiment, the collection tube may be fitted for the outlet in the rear left, rear right of the apparatus.

In one example, the flap closure cover may extend to the entire base layer of the apparatus. In another example, the collection bag and tote bag may be one single bag. Furthermore, the connectors at the outlet portion and the collection bag may have male and female connections.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All the features disclosed in this specification (including any accompanying claims, abstract, and drawings), and all of the steps of any method or process so disclosed, may be combined in any combination, except combinations where at least some of such features or steps are mutually exclusive.

The terms "include," "have," and variations thereof, as used herein, have the same meaning as the term "comprise" or an appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A female urination assistance apparatus for a chair comprising:

a base layer wherein the base layer is a semi-rigid flat structure placed on top of the chair's seat;

a lower foam assembly disposed on top of the base layer wherein the lower foam assembly includes a plurality of channels for positioning of a collection tube, wherein a user selects one of the plurality of channels for positioning the collection tube;

collection fittings disposed in the lower foam assembly, wherein the collection fittings include an inlet portion comprising a press-fit medical grade plastic barb tube fitting, the collection tube, and an outlet portion comprising a quick disconnect tube fitting, wherein urine is collected through the inlet portion and transferred to the outlet portion via the collection tube;

a silicon support securely enclosing the inlet portion of the collection fittings, wherein the silicon support is permanently attached to the lower foam assembly;

a collection funnel retained in the silicon support, wherein the collection funnel is made of medical graded silicon and has an opening for outflow in a middle portion;

an upper foam assembly permanently affixed to the lower foam assembly wherein the upper foam assembly is a set of cut foam components with a fixed central opening for the positioning and retention of the silicon support and the collection funnel;

a flap closure cover with gel insert wherein the flap closure cover with gel insert provides an interface between the user and the apparatus while covering the entire apparatus;

a urine collection bag connected to the outlet portion of the collection fittings wherein the urine collection bag has a push valve that aids in drainage of the collected urine from the collection tubing; and a tote bag containing the urine collection bag wherein the tote bag is hung onto the chair.

2. The apparatus as claimed in claim 1 wherein the lower foam assembly is a set of cut out foam components that are semi-permanently fixed to the base layer.

3. The apparatus as claimed in claim 1 wherein the flap closure cover with gel insert is flexible and liquid proof.

4. The apparatus as claimed in claim 1 wherein the collection funnel is permanently affixed to the liquid-proof flap closure cover with gel insert for preventing inadvertent leakage.

5. The apparatus as claimed in claim 1 wherein the silicon support is a cast or mold of medical grade silicon.

6. The apparatus as claimed in claim 1 wherein the collection fittings are adjusted by removing all or a portion of the base layer.

7. The apparatus as claimed in claim 1 wherein the urine collection bag is a replaceable bag.

* * * * *